(12) United States Patent
Todd et al.

(10) Patent No.: US 7,228,904 B2
(45) Date of Patent: Jun. 12, 2007

(54) COMPOSITIONS AND METHODS FOR IMPROVING FRACTURE CONDUCTIVITY IN A SUBTERRANEAN WELL

(75) Inventors: Bradley L. Todd, Duncan, OK (US); Michael N. Mang, Eden Prairie, MN (US)

(73) Assignee: Halliburton Energy Services, Inc., Duncan, OK (US)

( * ) Notice: Subject to any disclaimer, the term of this patent is extended or adjusted under 35 U.S.C. 154(b) by 263 days.

(21) Appl. No.: 11/048,465

(22) Filed: Feb. 1, 2005

(65) Prior Publication Data

US 2005/0126780 A1    Jun. 16, 2005

Related U.S. Application Data

(63) Continuation-in-part of application No. 10/608,291, filed on Jun. 27, 2003, now Pat. No. 7,044,220.

(51) Int. Cl.
*E21B 43/267* (2006.01)

(52) U.S. Cl. .................. 166/280.2; 166/280.1; 166/281; 166/300; 507/211; 507/260; 507/269; 507/924

(58) Field of Classification Search ............... 166/276, 166/278, 280.1, 280.2, 281, 295, 300, 308.1, 166/308.2; 507/211, 219, 260, 269, 902, 507/924
See application file for complete search history.

(56) References Cited

U.S. PATENT DOCUMENTS

| | | | |
|---|---|---|---|
| 2,238,671 A | 4/1941 | Woodhouse | |
| 2,703,316 A | 3/1955 | Palmer | 260/78.3 |
| 3,173,484 A * | 3/1965 | Huitt et al. | 166/280.1 |
| 3,195,635 A | 7/1965 | Fast | 166/280.1 |
| 3,272,650 A | 9/1966 | MacVittie | 134/7 |
| 3,302,719 A | 2/1967 | Fischer | 166/280.2 |
| 3,364,995 A | 1/1968 | Atkins et al. | 166/280.1 |
| 3,366,178 A | 1/1968 | Malone et al. | 166/280.1 |
| 3,455,390 A | 7/1969 | Gallus | 166/295 |
| 3,784,585 A | 1/1974 | Schmitt et al. | 260/861 |
| 3,819,525 A | 6/1974 | Hattenbrun | 252/132 |
| 3,828,854 A | 8/1974 | Templeton et al. | 166/307 |
| 3,868,998 A | 3/1975 | Lybarger et al. | 166/278 |
| 3,912,692 A | 10/1975 | Casey et al. | 260/78.3 |
| 3,948,672 A | 4/1976 | Harnsberger | |
| 3,955,993 A | 5/1976 | Curtice et al. | |
| 3,960,736 A | 6/1976 | Free et al. | |
| 3,968,840 A | 7/1976 | Tate | 166/280.1 |
| 3,998,272 A | 12/1976 | Maly | 166/281 |
| 3,998,744 A | 12/1976 | Arnold et al. | 507/269 |
| 4,068,718 A | 1/1978 | Cooke, Jr. et al. | 166/280.2 |
| 4,169,798 A | 10/1979 | DeMartino | |
| 4,172,066 A | 10/1979 | Zweigle et al. | 260/29.6 TA |
| 4,261,421 A | 4/1981 | Watanabe | 166/281 |
| 4,387,769 A | 6/1983 | Erbstoesser et al. | 166/295 |
| 4,460,052 A | 7/1984 | Gockel | 175/72 |
| 4,470,915 A | 9/1984 | Conway | |
| 4,498,995 A | 2/1985 | Gockel | |
| 4,526,695 A | 7/1985 | Erbstoesser et al. | |
| 4,694,905 A | 9/1987 | Armbruster | |
| 4,715,967 A | 12/1987 | Bellis | |
| 4,716,964 A | 1/1988 | Erbstoesser et al. | 166/284 |
| 4,785,884 A | 11/1988 | Armbruster | 166/280 |
| 4,797,262 A | 1/1989 | Dewitz | 422/142 |
| 4,809,783 A | 3/1989 | Hollenbeck et al. | 166/307 |
| 4,817,721 A | 4/1989 | Pober | 166/295 |
| 4,843,118 A | 6/1989 | Lai et al. | 524/555 |
| 4,848,467 A | 7/1989 | Cantu et al. | 166/281 |
| 4,886,354 A | 12/1989 | Welch et al. | 356/70 |
| 4,957,165 A | 9/1990 | Cantu et al. | 166/295 |
| 4,961,466 A | 10/1990 | Himes et al. | 166/250 |
| 4,986,353 A | 1/1991 | Clark et al. | 166/279 |
| 4,986,354 A | 1/1991 | Cantu et al. | 166/279 |
| 4,986,355 A | 1/1991 | Casad et al. | 166/295 |
| 5,082,056 A | 1/1992 | Tackett, Jr. | 166/295 |
| 5,142,023 A | 8/1992 | Gruber et al. | 528/354 |
| 5,216,050 A | 6/1993 | Sinclair | 524/108 |
| 5,247,059 A | 9/1993 | Gruber et al. | 528/354 |

(Continued)

FOREIGN PATENT DOCUMENTS

EP    0 510 762 A2    4/1992

(Continued)

OTHER PUBLICATIONS

U.S. Appl. No. 10/650,101, filed Aug. 26, 2003, Todd, et al.

(Continued)

*Primary Examiner*—George Suchfield
(74) *Attorney, Agent, or Firm*—Robert A. Kent; Baker Botts

(57) ABSTRACT

The invention relates to enhancing the conductivity of fractures in a subterranean formation so as to enhance fluid flow therethrough. In one embodiment, the present invention provides a method comprising: providing a proppant matrix composition, the proppant matrix composition comprising at least a plurality of proppant particulates and at least a plurality of composite particles, the composite particles comprising a degradable material and a filler material; introducing the proppant matrix composition to the fracture so as to form a proppant matrix in the fracture; and allowing the degradable material of the composite particles to degrade so as to form at least one void in the proppant matrix.

20 Claims, No Drawings

U.S. PATENT DOCUMENTS

| | | | |
|---|---|---|---|
| 5,249,627 A | 10/1993 | Harms et al. | |
| 5,249,628 A | 10/1993 | Surjaatmadja | 166/305 |
| 5,295,542 A | 3/1994 | Cole et al. | 166/278 |
| 5,325,923 A | 7/1994 | Surjaatmadja et al. | 166/308 |
| 5,330,005 A | 7/1994 | Card et al. | 166/280 |
| 5,359,026 A | 10/1994 | Gruber | 528/354 |
| 5,360,068 A | 11/1994 | Sprunt et al. | 166/259 |
| 5,363,916 A | 11/1994 | Himes et al. | 166/276 |
| 5,373,901 A | 12/1994 | Norman et al. | 166/300 |
| 5,386,874 A | 2/1995 | Laramay et al. | 166/300 |
| 5,396,957 A | 3/1995 | Surjaatmadja et al. | 166/308 |
| 5,402,846 A | 4/1995 | Jennings, Jr. et al. | 166/259 |
| 5,439,055 A | 8/1995 | Card et al. | 166/280 |
| 5,460,226 A | 10/1995 | Lawton et al. | 166/300 |
| 5,464,060 A | 11/1995 | Hale et al. | 166/293 |
| 5,475,080 A | 12/1995 | Gruber et al. | 528/354 |
| 5,484,881 A | 1/1996 | Gruber et al. | 528/354 |
| 5,497,830 A | 3/1996 | Boles et al. | 166/300 |
| 5,499,678 A | 3/1996 | Surjaatmadja et al. | 166/298 |
| 5,505,787 A | 4/1996 | Yamaguchi | 134/4 |
| 5,512,071 A | 4/1996 | Yam et al. | 51/307 |
| 5,536,807 A | 7/1996 | Gruber et al. | 528/354 |
| 5,591,700 A | 1/1997 | Harris et al. | 507/204 |
| 5,594,095 A | 1/1997 | Gruber et al. | 528/354 |
| 5,604,186 A | 2/1997 | Hunt et al. | 507/204 |
| 5,607,905 A | 3/1997 | Dobson, Jr. et al. | 507/211 |
| 5,670,473 A | 9/1997 | Scepanski | 510/445 |
| 5,698,322 A | 12/1997 | Tsai et al. | 428/373 |
| 5,765,642 A | 6/1998 | Surjaatmadja | 166/297 |
| 5,791,415 A | 8/1998 | Nguyen et al. | 166/280 |
| 5,833,000 A | 11/1998 | Weaver et al. | 166/276 |
| 5,839,510 A | 11/1998 | Weaver et al. | 166/276 |
| 5,849,401 A | 12/1998 | El-Afandi et al. | 428/215 |
| 5,853,048 A | 12/1998 | Weaver et al. | 166/279 |
| 5,893,416 A | 4/1999 | Read | 166/304 |
| 5,908,073 A | 6/1999 | Nguyen et al. | 166/276 |
| 5,924,488 A | 7/1999 | Nguyen et al. | 166/280 |
| 5,964,291 A | 10/1999 | Bourne et al. | 166/279 |
| 6,004,400 A | 12/1999 | Bishop et al. | 134/2 |
| 6,024,170 A | 2/2000 | McCabe et al. | 166/300 |
| 6,028,113 A | 2/2000 | Scepanski | 514/643 |
| 6,047,772 A | 4/2000 | Weaver et al. | 166/276 |
| 6,059,034 A | 5/2000 | Rickards et al. | 166/280 |
| 6,114,410 A | 9/2000 | Betzold | 523/130 |
| 6,123,965 A | 9/2000 | Jacob et al. | 424/489 |
| 6,131,661 A | 10/2000 | Conner et al. | 166/300 |
| 6,135,987 A | 10/2000 | Tsai et al. | 604/365 |
| 6,143,698 A | 11/2000 | Murphey et al. | 507/145 |
| 6,162,766 A | 12/2000 | Muir et al. | 507/267 |
| 6,169,058 B1 | 1/2001 | Le et al. | 507/222 |
| 6,172,011 B1 | 1/2001 | Card et al. | 507/204 |
| 6,189,615 B1 | 2/2001 | Sydansk | 166/270 |
| 6,202,751 B1 | 3/2001 | Chatterji et al. | 166/276 |
| 6,209,643 B1 | 4/2001 | Nguyen et al. | 166/276 |
| 6,209,646 B1 | 4/2001 | Reddy et al. | 166/300 |
| 6,214,773 B1 | 4/2001 | Harris et al. | 507/271 |
| 6,242,390 B1 | 6/2001 | Mitchell et al. | 507/211 |
| 6,260,622 B1 | 7/2001 | Blok et al. | 166/305.1 |
| 6,311,773 B1 | 11/2001 | Todd et al. | 166/280 |
| 6,323,307 B1 | 11/2001 | Bigg et al. | 528/354 |
| 6,326,458 B1 | 12/2001 | Gruber et al. | 528/354 |
| 6,328,105 B1 | 12/2001 | Betzold | 166/280 |
| 6,357,527 B1 | 3/2002 | Norman et al. | 166/300 |
| 6,364,945 B1 | 4/2002 | Chatterji et al. | 106/677 |
| 6,380,138 B1 | 4/2002 | Ischy et al. | 507/204 |
| 6,387,986 B1 | 5/2002 | Moradi-Araghi et al. | 523/211 |
| 6,390,195 B1 | 5/2002 | Nguyen et al. | 166/276 |
| 6,394,185 B1 | 5/2002 | Constien | 166/296 |
| 6,422,314 B1 | 7/2002 | Todd et al. | 166/312 |
| 6,439,309 B1 | 8/2002 | Matherly et al. | 166/276 |
| 6,454,003 B1 | 9/2002 | Chang et al. | 166/270 |
| 6,485,947 B1 | 11/2002 | Rajgarhia et al. | 435/139 |
| 6,488,091 B1 | 12/2002 | Weaver et al. | 166/300 |
| 6,488,763 B2 | 12/2002 | Brothers et al. | 106/692 |
| 6,494,263 B2 | 12/2002 | Todd | 166/312 |
| 6,508,305 B1 | 1/2003 | Brannon et al. | 166/293 |
| 6,527,051 B1 | 3/2003 | Reddy et al. | 166/300 |
| 6,554,071 B1 | 4/2003 | Crook et al. | 166/293 |
| 6,569,814 B1 | 5/2003 | Brady et al. | 507/201 |
| 6,599,863 B1 | 7/2003 | Palmer et al. | 507/219 |
| 6,667,279 B1 | 12/2003 | Hessert et al. | 507/225 |
| 6,669,771 B2 | 12/2003 | Tokiwa et al. | 106/162.7 |
| 6,681,856 B1 | 1/2004 | Chatterji et al. | 166/294 |
| 6,686,328 B1 | 2/2004 | Binder | 510/446 |
| 6,702,023 B1 | 3/2004 | Harris et al. | 166/307 |
| 6,710,019 B1 | 3/2004 | Sawdon et al. | 507/136 |
| 6,761,218 B2 | 7/2004 | Nguyen et al. | 166/278 |
| 6,763,888 B1 | 7/2004 | Harris et al. | 166/305.1 |
| 6,817,414 B2 | 11/2004 | Lee | 166/278 |
| 6,896,058 B2 | 5/2005 | Munoz, Jr. et al. | 166/279 |
| 6,949,491 B2 | 9/2005 | Cooke, Jr. | 507/219 |
| 7,044,220 B2 * | 5/2006 | Nguyen et al. | 166/280.2 |
| 2001/0016562 A1 | 8/2001 | Muir et al. | 507/201 |
| 2002/0020527 A1 * | 2/2002 | Kilaas et al. | 166/250.01 |
| 2002/0036088 A1 | 3/2002 | Todd | 166/300 |
| 2002/0125012 A1 | 9/2002 | Dawson et al. | 166/300 |
| 2003/0060374 A1 | 3/2003 | Cooke, Jr. | 507/200 |
| 2003/0114314 A1 | 6/2003 | Ballard et al. | 507/100 |
| 2003/0130133 A1 | 7/2003 | Vollmer | 507/100 |
| 2003/0188766 A1 | 10/2003 | Banerjee et al. | 134/7 |
| 2003/0234103 A1 | 12/2003 | Lee et al. | 166/293 |
| 2004/0014607 A1 | 1/2004 | Sinclair et al. | 507/200 |
| 2004/0040706 A1 | 3/2004 | Hossaini et al. | 166/278 |
| 2004/0055747 A1 | 3/2004 | Lee | 166/278 |
| 2004/0094300 A1 | 5/2004 | Sullivan et al. | 166/308.1 |
| 2004/0106525 A1 | 6/2004 | Willbert et al. | 507/200 |
| 2004/0138068 A1 | 7/2004 | Rimmer et al. | 507/100 |
| 2004/0152601 A1 | 8/2004 | Still et al. | 507/100 |
| 2004/0152602 A1 | 8/2004 | Boles | 507/100 |
| 2004/0216876 A1 | 11/2004 | Lee | 166/280.1 |
| 2004/0231845 A1 | 11/2004 | Cooke, Jr. | 166/279 |
| 2004/0261993 A1 | 12/2004 | Nguyen | 166/276 |
| 2004/0261996 A1 | 12/2004 | Munoz, Jr. et al. | 166/279 |
| 2004/0261999 A1 * | 12/2004 | Nguyen | 166/292 |
| 2005/0006095 A1 | 1/2005 | Justus et al. | 166/295 |
| 2005/0028976 A1 | 2/2005 | Nguyen | 166/276 |
| 2005/0034861 A1 | 2/2005 | Saini et al. | 166/278 |
| 2005/0034865 A1 | 2/2005 | Todd et al. | 166/304 |
| 2005/0034868 A1 | 2/2005 | Frost et al. | 166/307 |
| 2005/0103496 A1 | 5/2005 | Todd et al. | 166/278 |
| 2005/0252659 A1 | 11/2005 | Sullivan et al. | 166/280.1 |
| 2005/0272613 A1 | 12/2005 | Cooke, Jr. | 507/219 |

FOREIGN PATENT DOCUMENTS

| | | |
|---|---|---|
| EP | 0 879 935 A2 | 11/1998 |
| EP | 0 879 935 A3 | 2/1999 |
| EP | 1 413 710 A1 | 4/2004 |
| EP | 1 447 523 A1 | 8/2004 |
| GB | 2 348 907 A | 10/2000 |
| WO | WO 93/15127 A1 | 8/1993 |
| WO | WO 94/07949 A1 | 4/1994 |
| WO | WO 94/08078 A1 | 4/1994 |
| WO | WO 94/08090 A1 | 4/1994 |
| WO | WO 95/09879 A1 | 4/1995 |
| WO | WO 97/11845 A1 | 4/1997 |
| WO | WO 99/27229 | 6/1999 |
| WO | WO 2000/57022 | 9/2000 |
| WO | WO 2001/002698 | 1/2001 |
| WO | WO 01/87797 A1 | 11/2001 |
| WO | WO 02/12674 A1 | 3/2003 |
| WO | WO 03/027431 A2 | 4/2003 |
| WO | WO 03/027431 A3 | 4/2003 |
| WO | WO 2004/007905 | 1/2004 |

| | | |
|---|---|---|
| WO | WO 2004/037946 A1 | 5/2004 |
| WO | WO 2004/038176 A1 | 5/2004 |
| WO | WO 2005/085595 A1 | 9/2005 |

OTHER PUBLICATIONS

U.S. Appl. No. 10/655,883, filed Jul. 7, 2004, Nguyen.
U.S. Appl. No. 10/661,173, filed Sep. 11, 2003, Todd, et al.
U.S. Appl. No. 10/664,126, filed Sep. 17, 2003, Todd, et al.
U.S. Appl. No. 10/736,152, filed Dec. 15, 2003, Todd.
U.S. Appl. No. 10/765,334, filed Jan. 27, 2004, Todd, et al.
U.S. Appl. No. 10/768,323, filed Jan. 30, 2004, Roddy, et al.
U.S. Appl. No. 10/768,864, filed Jan. 30, 2004, Roddy, et al.
U.S. Appl. No. 10/769,490, filed Jan. 30, 2004, Roddy, et al.
U.S. Appl. No. 10/783,207, filed Feb. 20, 2004, Surjaatmadja, et al.
U.S. Appl. No. 10/785,300, filed Feb. 24, 2004, Frost, et al.
U.S. Appl. No. 10/802,340, filed Mar. 17, 2004, Reddy, et al.
U.S. Appl. No. 10/803,668, filed Mar. 17, 2004, Todd, et al.
U.S. Appl. No. 10/803,689, filed Mar. 18, 2004, Todd, et al.
U.S. Appl. No. 10/832,163, filed Apr. 26, 2004, Munoz, Jr., et al.
U.S. Appl. No. 10/897,509, filed Jul. 23, 2004, Pauls, et al.
U.S. Appl. No. 10/915,024, filed Aug. 10, 2004, Nguyen.
U.S. Appl. No. 10/932,749, filed Sep. 2, 2004, Harris, et al.
U.S. Appl. No. 10/933,705, filed Sep. 3, 2004, Kalman.
U.S. Appl. No. 10/950,072, filed Sep. 24, 2004, Nguyen, et al.
U.S. Appl. No. 10/991,228, filed Nov. 17, 2004, Munoz, Jr., et al.
U.S. Appl. No. 10/991,248, filed Nov. 17, 2004, Munoz, Jr., et al.
U.S. Appl. No. 11/046,043, filed Jan. 28, 2005, Todd, et al.
U.S. Appl. No. 11/046,652, filed Jan. 28, 2005, Todd, et al.
U.S. Appl. No. 11/047,876, filed Jan. 31, 2005, Mang, et al.
U.S. Appl. No. 11/048,417, filed Jan. 31, 2005, Mang, et al.
Attia, Yosry, et al, *Adsorption Thermodynamics of a Hydrophobic Polymeric Flocculant on Hydrophobic Colloidal Coal Particles*, 1991, American Chemical Society, *Langmuir*, 7, pp. 2203-2207.
Y. Chiang et al.: "Hydrolysis of Ortho Esters: Further Investigation of the Factors Which Control the Rate-Determining Step," Engineering Information Inc., NY, NY, vol. 105, No. 23 (XP-002322842), Nov. 16, 1983.
M. Ahmad, et al.: Ortho Ester Hydrolysis: Direct Evidence for a Three-Stage Reaction Mechanism, Engineering Information Inc., NY, NY, vol. 101, No. 10 (XP-002322843), May 9, 1979.
Skrabal et al., *The Hydrolysis Rate of Orthoformic Acid Ethyl Ether*, Chemical Institute of the University of Graz, pp. 1-38, Jan. 13, 1921.
Heller, et al., *Poly(ortho ester)—From Concept To Reality*, Biomacromolecules, vol. 5, No. 5, 2004 (pp. 1625-1632), May 9, 1979.
Schwach-Abdellaoui, et al., *Hydrolysis and Erosion Studies of Autocatalyzed Poly(ortho esters) Containing Lactoyl-Lactyl Acid Dimers*, American Chemical Society, vol. 32, No. 2, 1999 (pp. 301-307).
Ng, et al., *Synthesis and Erosion Studies of Self-Catalyzed Poly(ortho ester)s*, American Chemical Society, vol. 30, No. 4, 1997 (pp. 770-772).
Ng, et al., *Development Of A Poly(ortho ester) prototype With A Latent Acid In The Polymer Backbone For 5-fluorouracil Delivery*, Journal of Controlled Release 65 (2000), (pp. 367-374).
Rothen-Weinhold, et al., Release of BSA from poly(ortho ester) extruded thin strands, *Journal of Controlled Release 71*, 2001, (pp. 31-37).
Heller, et al., *Poly(ortho ester)s—their development and some recent applications*, European Journal of Pharmaceutics and Biopharmaceutics, 50, 2000, (pp. 121-128).
Heller, et al., *Poly(ortho esters); synthesis, characterization, properties and uses*, Advanced Drug Delivery Reviews, 54, 2002, (pp. 1015-1039).
Heller, et al., *Poly(ortho esters) For The Pulsed And Continuous Delivery of Peptides And Proteins*, Controlled Release and Biomedical Polymers Department, SRI International, (pp. 39-46).

Zignani, et al., *Subconjunctival biocompatibility of a viscous bioerodable poly(ortho ester)*, J. Biomed Mater Res, 39, 1998, pp. 277-285.
Toncheva, et al., *Use of Block Copolymers of Poly(Ortho Esters) and Poly (Ethylene Glycol)*, Journal of Drug Targeting, 2003, vol. 11(6), pp. 345-353.
Schwach-Abdellaoui, et al., *Control of Molecular Weight For Auto-Catalyzed Poly(ortho ester)Obtained by Polycondensation Reaction*, International Journal of Polymer Anal. Charact., 7: 145-161, 2002, pp. 145-161.
Heller, et al., *Release of Norethindrone from Poly(Ortho Esters)*, Polymer Engineering and Science, Mid-Aug. 1981, vol. 21, No. 11 (pp. 727-731).
Cordes, et al., *Mechanism and Catalysis for Hydrolysis of Acetals, Ketals, and Other Esters*, Department of Chemistry, Indiana University, Bloomington, Indiana, Chemical Reviews, 1974, vol. 74, No. 5, pp. 581-603.
Todd, et al., *A Chemical "Trigger" Useful for Oilfield Applications*, Society of Petroleum Engineers, Inc., SPE 92709, Feb. 4, 2005.
Foreign Counterpart and Search Report for International Patent Application No. PCT/GB2005/002984, Nov. 28, 2005.
U.S. Appl. No. 10/864,061, filed Jun. 9, 2004, Blauch, et al.
U.S. Appl. No. 10/864,618, filed Jun. 9, 2004, Blauch, et al.
U.S. Appl. No. 10/608,291, filed Jun. 27, 2003, Nguyen, et al.
U.S. Appl. No. 10/947,427, filed Sep. 20, 2004, Blauch, et al.
U.S. Appl. No. 11/048,489, Todd, et al.
Simmons, et al., *Poly(phenyllactide): Synthesis, Characterization, and Hydrolytic Degradation*, Biomacromolecules, vol. 2, No. 2, 2001 (pp. 658-663).
Yin, et al., *Preparation and Characterization of Substituted Polylactides*, American Chemical Society, vol. 32, No. 23, 1999 (pp. 7711-7718).
Yin, et al., *Synthesis and Properties of Polymers Derived form Substituted Lactic Acids*, American Chemical Society, Ch. 12, 2001 (pp. 147-159).
Cantu, et al, *Laboratory and Field Evaluation of a Combined Fluid-Loss-Control Additive and Gel Breaker for Fracturing Fluids*, SPE 18211, Society of Petroleum Engineers, 1990.
Love, et al, *Selectively Placing Many Fractures in Openhole Horizontal Wells Improves Production*, SPE 50422, Society of Petroleum Engineers, 1998.
McDaniel, et al, *Evolving New Stimulation Process Proves Highly Effective in Level 1 Dual-Lateral Completion*, SPE 78697, Society of Petroleum Engineers, 2002.
Albertsson, et al, *Aliphatic Polyesters: Systhesis, Properties and Applications*, Advances in Polymer Science, vol. 157, Degradable Aliphatic Polyesters, 2002.
Dechy-Cabaret, et al, *Controlled Ring-Opening Polymerization of Lactide and Glycolide*, American Chemical Society, Chemical Reviews, A-Z, AA-AD, received 2004.
Funkhouser, et al, *Synthetic Polymer Fracturing Fluid for High-Temperature Applications*, SPE 80236, Society of Petroleum Engineers, 2003.
*Chelating Agents*, Encyclopedia of Chemical Technology, vol. 5 (764-795).
Vichaibun, et al, *A New Assay for the Enzymatic Degradation of Polylactic Acid, Short Report*, ScienceAsia, vol. 29, 2003 (pp. 297-300).
Halliburton, SurgiFrac$^{SM}$ Service, *A Quick and Cost-Effective Method to Help Boost Production From Openhole Horizontal Completions, Halliburton Communications*, HO3297, 2002.
Halliburton, Cobra Frac$^{SM}$ Service, *Coiled Tubing Fracturing—Cost-Effective Method for Stimulating Untapped Reserves*, HO2319R, Halliburton Energy Services, 2000.
Halliburton, CobraJet Frac$^{SM}$ Service, *Cost-effective Technology That Can Help Reduce Cost Per BOE Produced, Shorten Cycle Time and Reduce Capex*, Halliburton Communications.

\* cited by examiner

COMPOSITIONS AND METHODS FOR IMPROVING FRACTURE CONDUCTIVITY IN A SUBTERRANEAN WELL

CROSS-REFERENCE TO RELATED APPLICATION

This Application is a continuation-in-part of U.S. application Ser. No. 10/608,291, entitled "Compositions and Methods for Improving Proppant Pack Permeability in a Subterranean Well," filed on Jun. 27, 2003 now U.S. Pat. No. 7,044,220.

BACKGROUND

The present invention relates to enhancing fluid flow from subterranean formations, and more particularly, to enhancing the conductivity of fractures in a subterranean formation so as to enhance fluid flow therethrough.

Hydraulic fracturing is a technique for stimulating the production of desirable fluids from a subterranean formation. The technique normally involves introducing a viscous liquid through a well bore into a formation at a chosen rate and pressure to enhance and/or create a fracture in a portion of the formation, and placing proppant particulates in the resultant fracture to, inter alia, maintain the fracture in a propped condition when the pressure is released. The resultant propped fracture provides a conductive channel in the formation for fluids to flow to the well bore.

The degree of stimulation afforded by the hydraulic fracturing treatment is largely dependent on the conductivity and width of the propped fracture. Thus, the productivity of the well in effect becomes a function of fracture conductivity, which is commonly defined as proppant permeability times fracture width. To enhance well productivity, it may be beneficial to enhance fracture conductivity.

Oftentimes, to effectively prop open the fractures as well as prevent proppant particulate flowback, the proppant particulates are caused or allowed to consolidate into proppant matrixes within the fractures. One conventional means of doing this is to use resin-coated proppant particulates so that when the resin cures downhole, the proppant particulates can consolidate to form a relatively stable proppant matrix within the fracture. Other methods also have been used to facilitate the consolidation of the proppant particulates within the fractures.

Although consolidating the proppant particulates within a fracture may have some benefits, for example preventing proppant flowback, such methods may adversely affect the conductivity of the fracture. That is, some methods of consolidating proppant particulates themselves may introduce a barrier to the free flow of desirable fluids from the subterranean formation to the well bore for subsequent production. Fracture conductivity may suffer as a result. This is undesirable as this may affect overall well productivity.

To counteract this potential problem, many different techniques have been developed. One technique involves adding calcium carbonate or salt to the proppant matrix composition. When the proppant particulates consolidate, after a subsequent fluid is added to the well bore, the calcium carbonate or salt is dissolved out of the matrix. At least one problem associated with this method is the incomplete removal of the calcium carbonate or salt if not adequately contacted with the subsequent fluid. Another method has been to add wax beads to the proppant matrix composition. Once incorporated into the consolidated proppant particulates, the wax beads melt as a result of the temperature of the formation. A problem with this method is that the wax may re-solidify in the well, causing countless problems. Another method that has been used is to add an oil-soluble resin to the proppant matrix composition; however, this method has not been successful because of, inter alia, nonuniform removal of the particles.

Another way to address fracture conductivity has been to use bigger proppant particulates. However, there are practical limits to the size of the proppant particulates that may be used. For instance, if the particles used are too large, premature screenout at the perforations and/or fractures during the proppant stage of fracturing treatment often occurs as a large amount of proppant particulates is being injected into the fractures. In addition, by using proppant particulates that are too large, the ability to control formation sand is lost as the formation sand or fines tend to invade or penetrate the large pore space of the proppant matrix during production of hydrocarbons, thus potentially choking the flow paths of the fluids.

SUMMARY

The present invention relates to enhancing fluid flow from subterranean formations, and more particularly, to enhancing the conductivity of fractures in a subterranean formation so as to enhance fluid flow therethrough.

In one embodiment, the present invention provides a method comprising: providing a proppant matrix composition, the proppant matrix composition comprising at least a plurality of proppant particulates and at least a plurality of composite particles, the composite particles comprising a degradable material and a filler material; introducing the proppant matrix composition to the fracture so as to form a proppant matrix in the fracture; and allowing the degradable material of the composite particles to degrade so as to form at least one void in the proppant matrix.

In another embodiment, the present invention provides a method comprising: providing a proppant matrix composition, the proppant matrix composition comprising at least a plurality of proppant particulates and at least a plurality of composite particles, the composite particles comprising a degradable material and a filler material; allowing the proppant matrix composition to form a proppant matrix; allowing the degradable material of the composite particle to degrade so as to form a void in the proppant matrix; and allowing a fluid to flow through the proppant matrix.

In another embodiment, the present invention provides a method comprising: providing a treatment fluid that comprises a proppant matrix composition, the proppant matrix composition comprising at least a plurality of proppant particulates and at least a plurality of composite particles, the composite particles comprising a degradable material and a filler material; contacting at least a portion of a subterranean formation with the treatment fluid under conditions effective to create or enhance at least one fracture in the subterranean formation; and allowing the proppant matrix composition to form a proppant matrix having at least one void therein.

The objects, features and advantages of the present invention will be readily apparent to those skilled in the art upon a reading of the description of the preferred embodiments that follows.

DESCRIPTION

The present invention relates to enhancing fluid flow from subterranean formations, and more particularly, to enhancing the conductivity of fractures in a subterranean formation so as to enhance fluid flow therethrough.

In preferred embodiments, the present invention provides compositions and methods for enhancing subterranean well productivity by enhancing fracture conductivity. The compositions and methods of the present invention may be used to enhance the conductivity of proppant matrixes within fractures so that fluids from the subterranean formation may flow more freely to the well bore. The compositions and methods may be used without negatively affecting the ability of the proppant matrix to perform other desired functions within the fracture, e.g., propping the fracture open or providing some degree of sand control. The compositions and methods also may be used to avoid the production of undesirable acids within the matrix that may result from the degradation of degradable materials within the matrix.

In the compositions and methods of this invention, a proppant matrix composition may be made to consolidate within a fracture to form a proppant matrix, e.g., a substantially stable proppant matrix. The term "proppant matrix," as used herein, refers to a consolidation of proppant particulates within a fracture that may be adjacent to a well bore in a subterranean formation. The mechanism by which the proppant matrix consolidates within the fracture is not important and so any suitable method can be used in conjunction with the present invention, e.g., through the use of curable resins, tackifying agents, and/or a mechanical method such as interlocking proppant particulates. The use of curable resins may be preferred.

The proppant matrix compositions of the present invention comprise proppant particulates and at least one "composite particle," at least a portion of which is capable of undergoing an irreversible degradation downhole. The composite particles used in the methods and compositions of this invention comprise a degradable material and a filler material. As used herein, the term "particle" or "particles" refers to a particle or particles that may have a physical shape of platelets, shavings, fibers, flakes, ribbons, rods, strips, spheroids, toroids, pellets, tablets, or any other suitable shape. The composite particles generally are more resistant to crushing forces within a fracture (as compared to degradable materials by themselves) and, therefore, may help support the fracture and maintain the integrity of the proppant matrix. Also, when the composite particle degrades from the proppant matrix, voids that have a desirable degree of integrity are formed, at least in part due to the high crush strength of the composite particles and the consolidation of the proppant matrix. Suitable degradable materials and filler materials will be discussed below. The proppant matrix compositions of the present invention also may comprise an acid reactive material. Each element of the proppant matrix compositions of this invention is discussed below.

The concentration of composite particles in the proppant matrix compositions of this invention may range from about 0.1% to about 30%, based on the weight of the proppant particulates in a particular composition. A concentration of composite particles between about 1% and about 5% by weight of the proppant particulates is preferred. At higher concentrations, there may be a point of diminishing returns, but this will be dependent on the particular factors, e.g., temperature, stress, how much filler is in the composite particle, etc. Additionally, one should note that the relative amounts of the composite particles in the proppant matrix composition should not be such that when degraded, an undesirable percentage of voids result in the proppant matrix that could potentially make the proppant matrix ineffective in maintaining the integrity of the fracture. One of ordinary skill in the art, with the benefit of this disclosure, will recognize an optimum concentration of composite particles that provides desirable values in terms of enhanced conductivity or permeability without undermining the stability of the proppant matrix itself.

Any proppant particulates suitable for use in subterranean applications are suitable for use in the compositions and methods of the present invention. For instance, natural sand, ground nut hulls, man-made proppant particulates, bauxite, ceramics, polymeric particulate materials, low-density proppant particulates, or the like are suitable. Ceramic proppant particulates, in certain embodiments, are preferred because of their strength. Natural sand is also a preferred material, especially when cost may be a concern. Note that the term "particulate" implies no particular shape or size of proppant particulates. Preferred particulates should conform generally to API RP-56 and/or RP-60. Suitable sizes for such proppant particulates may range from 4 to 100 U.S. mesh, but are preferably in the range of 10 to 60 U.S. mesh.

In some embodiments, the proppant particulates may be used in conjunction with a curable resin, e.g., the resin may be coated on the proppant particulates, such that the resin cures when downhole, resulting in a consolidation of the proppant particulates into a proppant matrix. If a resin is used, the proppant particulates can either be pre-coated or coated on the fly with a suitable curable resin. Any type of curable resin that will allow the proppant particulates to consolidate to form a proppant matrix is suitable for use in the present invention. Examples include, but are not limited to, epoxies, furans, phenolics, furfuryl aldehyde, furfuryl alcohol, or derivatives thereof, or a mixture thereof. If a curable resin is utilized, a better result may be achieved if the proppant particulates are coated with a suitable curable resin prior to being mixed with the composite particles.

Additionally, suitable tackifying agents may be used as an alternative to or in conjunction with curable resins. If used, the tackifying agent is preferably incorporated with the proppant particulates before it is mixed with the composite particles.

In some embodiments, it may be desirable to coat the proppant particulates with a tackifying agent rather than a curable resin. Such a tackifying agent is preferably incorporated with the proppant particulates before they are mixed with the degradable material. The tackifying agent, among other things, helps distribute the composite particle within the proppant matrix composition and helps keep it in place within the proppant matrix. Using a tackifying agent as opposed to a curable resin may be particularly useful if the composite particles used have a low density or specific gravity, or have a substantially different particle size than the proppant particulates. The use of a tackifying agent may help to reduce or eliminate the negative effects of segregation between the proppant particulates and the degradable material. Often, the composite particles will exhibit a significantly different density from the proppant particulates. In such cases, when the particulates are slurried into a carrier fluid to be sent to a portion of a subterranean formation, the composite particles may separate from the denser proppant particulates. Since the methods of the present invention preferably create a relatively uniform matrix of proppant particulates mixed with degradable material, that separation may cause the job to be less successful. The tacky nature of a chosen tackifying agent may help the chosen composite particles to at least temporarily attach to the proppant particulates. By becoming so attached, the negative effects of segregation may be reduced or eliminated.

In one embodiment of the present invention, the tackifying agent is coated onto the proppant particulates early in the proppant stage of the fracturing treatment. Then, resin-coated proppant particulates are used during the tail-in stage of the fracturing treatment. In another embodiment, the tackifying agent and the curable resin are coated on the proppant particulates intermittently.

Compositions suitable for use as tackifying agents in the present invention comprise any compound that, when in liquid form or in a solvent solution, will form a non-hardening coating upon a particulate. Some examples of suitable tackifying agents include non-aqueous tackifying agents, aqueous tackifying agents, and silyl modified polyamides.

Suitable non-aqueous tackifying agents generally comprise polyamides that are liquids or in solution at the temperature of the subterranean formation such that they are, by themselves, non-hardening when introduced into the subterranean formation. One suitable such tackifying agent comprises a condensation reaction product comprised of a polyacid and a polyamine. Such commercial products include compounds such as mixtures of C36 dibasic acids containing some trimer and higher oligomers and also small amounts of monomer acids that are reacted with polyamines. Other polyacids include trimer acids, synthetic acids produced from fatty acids, maleic anhydride, acrylic acid, and the like. Such acid compounds are commercially available from companies such as Witco Corporation, Union Camp, Chemtall, and Emery Industries. The reaction products are available from, for example, Champion Technologies, Inc. and Witco Corporation. Additional compounds which may be used as tackifying compounds include liquids and solutions of, for example, polyesters, polycarbonates and polycarbamates, and natural resins such as shellac and the like. Other suitable tackifying agents are described in U.S. Pat. No. 5,853,048, issued to Weaver, et al., and U.S. Pat. No. 5,833,000, issued to Weaver, et al., the relevant disclosures of which are herein incorporated by reference.

Such non-aqueous tackifying agents may be either used such that they form non-hardening coating or they may be combined with a multifunctional material capable of reacting with the tackifying compound to form a hardened coating. A "hardened coating," as used herein, means that the reaction of the tackifying compound with the multifunctional material will result in a substantially non-flowable reaction product that exhibits a higher compressive strength in a consolidated agglomerate than the tackifying compound alone with the particulates. In this instance, the tackifying agent may function similarly to a hardenable resin. Multifunctional materials suitable for use in the present invention include, but are not limited to, aldehydes such as formaldehyde, dialdehydes such as glutaraldehyde, hemiacetals or aldehyde, releasing compounds, diacid halides, dihalides such as dichlorides and dibromides, polyacid anhydrides such as citric acid, epoxides, furfuraldehyde, glutaraldehyde or aldehyde condensates and the like, and combinations thereof. In some embodiments of the present invention, the multifunctional material may be admixed with the tackifying compound in an amount of from about 0.01% to about 50% by weight of the tackifying compound to effect formation of the reaction product. In some preferred embodiments, the compound is present in an amount of from about 0.5% to about 1% by weight of the tackifying compound. Suitable multifunctional materials are described in U.S. Pat. No. 5,839,510, issued to Weaver, et al., the relevant disclosure of which is herein incorporated by reference.

Another suitable group of tackifying agents is aqueous tackifying agents; that is, tackifying agents that are soluble in aqueous fluids. Suitable aqueous tackifying agents are capable of forming at least a partial coating upon the surface of a particulate (such as proppant particulates). Generally, suitable aqueous tackifying agents are not significantly tacky when placed onto a particulate, but are capable of being "activated" (that is destabilized, coalesced and/or reacted) to transform the compound into a sticky, tackifying compound at a desirable time. Such activation may occur before, during, or after the aqueous tackifying agent is placed in the subterranean formation. In some embodiments, a pretreatment may be first contacted with the surface of a particulate to prepare it to be coated with an aqueous tackifying agent. Suitable aqueous tackifying agents are generally charged polymers that comprise compounds that, when in an aqueous solvent or solution, will form a non-hardening coating (by itself or with an activator) and, when placed on a particulate, will increase the continuous critical resuspension velocity of the particulate when contacted by a stream of water. The aqueous tackifying agents enhance the grain-to-grain contact between the individual particulates within the formation (be they proppant particulates, formation fines, or other particulates), helping to bring about the consolidation of the particulates into a cohesive, flexible, and permeable mass.

Examples of aqueous tackifier compounds suitable for use in the present invention include, but are not limited to, acrylic acid polymers, acrylic acid ester polymers, acrylic acid derivative polymers, acrylic acid homopolymers, acrylic acid ester homopolymers (such as poly(methyl acrylate), poly (butyl acrylate), and poly(2-ethylhexyl acrylate)), acrylic acid ester co-polymers, methacrylic acid derivative polymers, methacrylic acid homopolymers, methacrylic acid ester homopolymers (such as poly(methyl methacrylate), poly(butyl methacrylate), and poly(2-ethylhexyl methacrylate)), acrylamido-methyl-propane sulfonate polymers, acrylamido-methyl-propane sulfonate derivative polymers, acrylamido-methyl-propane sulfonate co-polymers, and acrylic acid/acrylamido-methyl-propane sulfonate co-polymers and combinations thereof. These and other suitable aqueous tackifying agents are described in U.S. application Ser. No. 10/864,061, filed on Jun. 9, 2004, and U.S. application Ser. No. 10/864,618, filed on Jun. 9, 2004, the relevant disclosures of which are herein incorporated by reference.

Silyl-modified polyamide compounds suitable for use as a tackifying agent in the present invention may be described as substantially self-hardening compositions that are capable of at least partially adhering to particulates in the unhardened state, and that are further capable of self-hardening themselves to a substantially non-tacky state to which individual particulates such as formation fines will not adhere to, for example, in formation or proppant matrix pore throats. Such silyl-modified polyamides may be based, for example, on the reaction product of a silating compound with a polyamide or a mixture of polyamides. The polyamide or mixture of polyamides may be one or more polyamide intermediate compounds obtained, for example, from the reaction of a polyacid (e.g., diacid or higher) with a polyamine (e.g., diamine or higher) to form a polyamide polymer with the elimination of water. Other suitable silyl-modified polyamides and methods of making such compounds are described in U.S. Pat. No. 6,439,309, issued to Matherly, et al., the relevant disclosure of which is herein incorporated by reference.

Where the proppant particulates are coated with a resin and/or a tackifying agent, the matrix may consolidate and avoid migration of the proppant particulates. As a proppant matrix is formed within a fracture, the composite particles should be distributed within the proppant matrix. In certain preferred embodiments, the distribution of the composite particles in the proppant matrix should be relatively uniform. In a preferred embodiment, the removal of the degradable material in the composite particles occurs after the proppant matrix has significantly developed and become relatively stable to minimize shifting or rearrangement of proppant particulates within the matrix.

Suitable degradable materials in the composite particles used in the proppant matrix compositions of this invention should be capable of undergoing an irreversible degradation downhole. The term "irreversible," as used herein, means that the degradable material should not reform a solid or reconsolidate while downhole, e.g., the degradable material should degrade in situ but should not recrystallize or reconsolidate in situ after degradation. The term "degradation" or "degradable" refers to at least the partial decomposition of the degradable material, and includes both homogeneous and heterogeneous forms of degradation. This degradation can be a result of, for example, a chemical or thermal reaction, or a reaction induced by radiation.

After the requisite time period dictated by the characteristics of the particular degradable material utilized in the composite particles of this invention, voids are created in the proppant matrix. Additionally, this degradation may result in the production of an acid, e.g., to perform a desired function like breaking a filter cake (for example, a filter cake in or near the fracture), breaking a viscosified fluid, and curing a resin in a fracture (for instance, resin coated on proppant particulates or on the faces of a fracture). The filler used in the composite particles in the proppant matrix composition can enhance either effect, i.e., the creation of voids or the production of an acid. The filler also may enhance the mechanical properties of the composite particles, and may be selected so as to not impair the mechanical properties of the proppant matrix. The resultant voids enhance the permeability of the matrix, which may result in, inter alia, enhanced fracture conductivity, which should lead to an enhancement in the productivity of the well. Enhanced fracture conductivity generally enhances well productivity as well productivity is a function of, inter alia, fracture conductivity. In a preferred embodiment, the degradation of the degradable material takes place after the proppant particulates consolidate to form a matrix inside a fracture or in place to minimize shifting or rearrangement of proppant particulates within the proppant matrix.

Nonlimiting examples of degradable materials that may be used in conjunction with the composite particles and the proppant matrix compositions and methods of the present invention include, but are not limited to, degradable polymers. The differing molecular structures of the degradable materials that are suitable for the present invention give a wide range of possibilities regarding regulating the degradation rate of the degradable material. In choosing the appropriate degradable material, one should consider the degradation products that will result. For instance, some may form an acid upon degradation, and the presence of the acid may be undesirable; others may form degradation products that would be insoluble, and these may be undesirable. Moreover, these degradation products should not adversely affect other operations or components.

The degradability of a polymer depends at least in part on its backbone structure. One of the more common structural characteristics is the presence of hydrolyzable and/or oxidizable linkages in the backbone. The rates of degradation of, for example, polyesters, are dependent on the type of repeat unit, composition, sequence, length, molecular geometry, molecular weight, morphology (e.g., crystallinity, size of spherulites, and orientation), hydrophilicity, surface area, and additives. Also, the environment to which the polymer is subjected may affect how the polymer degrades, e.g., temperature, presence of moisture, oxygen, microorganisms, enzymes, pH, and the like. One of ordinary skill in the art, with the benefit of this disclosure, will be able to determine what the optimum polymer would be for a given application considering the characteristics of the polymer utilized and the environment to which it will be subjected.

Suitable examples of polymers that may be used in accordance with the present invention include, but are not limited to, homopolymers, random aliphatic polyester copolymers, block aliphatic polyester copolymers, star aliphatic polyester copolymers, or hyperbranched aliphatic polyester copolymers. Such suitable polymers may be prepared by polycondensation reactions, ring-opening polymerizations, free radical polymerizations, anionic polymerizations, carbocationic polymerizations, coordinative ring-opening polymerization for, such as, lactones, and any other suitable process. Specific examples of suitable polymers include polysaccharides such as dextran or cellulose; chitins; chitosans; proteins; aliphatic polyesters; poly(lactides); poly(glycolides); poly($\epsilon$-caprolactones); poly(hydroxy ester ethers); poly(hydroxybutyrates); polyanhydrides; polycarbonates; poly(orthoesters); poly(acetals); poly(acrylates); poly(alkylacrylates); poly(amino acids); poly(ethylene oxide); poly ether esters; polyester amides; polyamides; polyphosphazenes; and copolymers or blends thereof Other degradable polymers that are subject to hydrolytic degradation also may be suitable. One guideline for choosing which composite particles to use in a particular application is what degradation products will result. Another guideline is the conditions surrounding a particular application.

Of these suitable polymers, aliphatic polyesters are preferred. Of the suitable aliphatic polyesters, polyesters of $\alpha$ or $\beta$ hydroxy acids are preferred. Poly(lactide) is most preferred. Poly(lactide) is synthesized either from lactic acid by a condensation reaction or more commonly by ring-opening polymerization of cyclic lactide monomer. The lactide monomer exists generally in three different forms: two stereoisomers L- and D-lactide; and D,L-lactide (meso-lactide). The chirality of the lactide units provides a means to adjust, inter alia, degradation rates, as well as the physical and mechanical properties after the lactide is polymerized. Poly(L-lactide), for instance, is a semicrystalline polymer with a relatively slow hydrolysis rate. This could be desirable in applications of the present invention where slow degradation of the degradable material is desired. Poly(D,L-lactide) is an amorphous polymer with a much faster hydrolysis rate. This may be suitable for other applications of the methods and compositions of the present invention. The stereoisomers of lactic acid may be used individually or combined for use in the compositions and methods of the present invention. Additionally, they may be copolymerized with, for example, glycolide or other monomers like $\epsilon$-caprolactone, 1,5-dioxepan-2-one, trimethylene carbonate, or other suitable monomers to obtain polymers with different properties or degradation times. Additionally, the lactic acid stereoisomers can be modified by blending high and low molecular weight polylactide or by blending polylactide with other aliphatic polyesters. For example, the degradation rate of polylactic acid may be affected by blending, for example, high and low molecular weight polylactides; mixtures of polylactide and lactide monomer; or by blending polylactide with other aliphatic polyesters.

The physical properties of degradable polymers may depend on several factors such as the composition of the repeat units, flexibility of the chain, presence of polar groups, molecular mass, degree of branching, crystallinity, orientation, etc. For example, short chain branches reduce the degree of crystallinity of polymers while long chain branches lower the melt viscosity and impart, inter alia, extensional viscosity with tension-stiffening behavior. The properties of the material utilized can be further tailored by blending, and copolymerizing it with another polymer, or by a change in the macromolecular architecture (e.g., hyperbranched polymers, star-shaped, or dendrimers, etc.). The properties of any such suitable degradable polymers (such as hydrophilicity, rate of biodegration, etc.) can be tailored by introducing functional groups along the polymer chains. One of ordinary skill in the art, with the benefit of this disclosure, will be able to determine the appropriate functional groups to introduce to the polymer chains to achieve the desired effect.

Also, we have found that a preferable result is achieved if the degradable material degrades slowly over time as opposed to instantaneously. Even more preferable results have been obtained when the degradable material does not begin to degrade until after the proppant matrix has developed some compressive strength. The slow degradation of the degradable material, inter alia, helps to maintain the stability of the proppant matrix.

The filler material chosen for the composite particles of this invention, inter alia, may enhance the mechanical properties of the composite particles (e.g., to enhance the crush strength of the composite particles), or may react with any degradation products that result from the degradation of the degradable material. In certain embodiments, the filler material may comprise from about 0.5% to about 60% of the composition of a composite particle. In preferred embodiments, the filler will comprise about 10% to about 40% of the composition of a composite particle. Also, the filler material may improve the modulus between the $T_g$ (the glass transition temperature) and the melting point of the degradable material. In other embodiments, the filler material chosen can interact with the degradation products produced when the degradable material degrades. Examples of such filler materials include anhydrous salts (see below), glass, talc, calcium carbonate, mica, magnesium oxide, mineral filler, barite, silica, materials that may be used as conventional bridging agents, derivatives thereof, and combinations thereof. For instance, if the degradation products include an acid, the filler may neutralize or enhance that acid. An example of a filler material that could neutralize the acid includes a base; an example of a filler material that could enhance the acid includes another complimentary acid. In still other embodiments, the filler material may release a second chemical. For instance, the filler material may comprise ethylenediaminetetraacetic acid ("EDTA"), an oxidizer, a breaker, sodium persulfate, or magnesium peroxide. In such embodiments the filler material should not negatively impact the degradable material; preferably, the filler material and the degradable material should compliment one another.

Examples of preferred nonreactive filler materials include anhydrous salts. An anhydrous salt is suitable for use in the present invention if it will degrade over time as it hydrates. For example, a particulate solid anhydrous borate material that degrades over time may be suitable. Specific examples of particulate solid anhydrous borate materials that may be used include, but are not limited to, anhydrous sodium tetraborate (also known as anhydrous borax), and anhydrous boric acid. These anhydrous borate materials are only slightly soluble in water. However, with time and heat in a subterranean environment, the anhydrous borate materials react with the surrounding aqueous fluid and may become hydrated. The resulting hydrated borate materials are highly soluble in water as compared to anhydrous borate materials and as a result degrade in the aqueous fluid. In some instances, the total time required for the anhydrous borate materials to degrade in an aqueous fluid is in the range of from about 8 hours to about 72 hours depending upon the temperature of the subterranean zone in which they are placed. Other examples include organic or inorganic salts like sodium acetate trihydrate.

Optionally, the composite particles of the present invention may comprise additional additives such as processing aids, lubricants, antistats, antiblock agents, pigments, derivatives thereof, or combinations thereof.

The composite particles used in conjunction with the present invention can be prepared by any suitable process for example, by bringing the components in solid form and dry-blending using conventional means such as a barrel mixer, a tumble mixer, and the like, followed by fluxing or melting in an appropriate apparatus, such as a Banbury type internal mixer, rubber mill, single or twin screw extruder or compounder, or the like. Preferably, the two components are brought together and processed in an appropriate melt extruder, from which the blend is extruded in the form of strands, which are pelletized for fabrication purposes. Other suitable techniques well known to those skilled in the art can be used as well.

If the application in which the composite particles will be used does not contain a component that will enable the degradable material to degrade, e.g., in a dry gas hole, then in alternative embodiments of the present invention, the degradable material can be mixed with an inorganic or organic compound in addition to or as a filler material. In preferred alternative embodiments, the inorganic or organic compound in the composite is hydrated. Examples of the hydrated organic or inorganic solid compounds that can be utilized include, but are not limited to, hydrates of organic acids or their salts such as sodium acetate trihydrate, L-tartaric acid disodium salt dihydrate, sodium citrate dihydrate, hydrates of inorganic acids or their salts such as sodium tetraborate decahydrate, sodium hydrogen phosphate heptahydrate, sodium phosphate dodecahydrate, amylose, starch-based hydrophilic polymers, and cellulose-based hydrophilic polymers. Of these, sodium acetate trihydrate is preferred. Additionally, if the degradable material is susceptible to hydrolysis, it is preferred that a sufficient amount of water is produced to effect hydrolytic degradation of the degradable material. The degradable material is then in a sense self-degradable, in that the degradable material should at least partially degrade in the releasable water provided by the hydrated organic or inorganic compound which dehydrates over time when heated in the subterranean zone.

The specific features of the composite particles may be chosen or modified to provide the proppant matrix with optimum conductivity while maintaining its desirable filtering capability. Preferably, the composite particles are selected to have a size and shape similar to the size and shape of the proppant particulates to help maintain substantial uniformity within the mixture. It is preferable if the proppant particulates and the composite particles do not segregate within the proppant matrix composition. Whichever composite particles are utilized, the composite particles may have any shape, depending on the desired characteristics of the resultant voids in the proppant matrix including, but not limited to, particles having the physical shape of platelets, shavings, flakes, ribbons, rods, strips, spheroids, toroids, pellets, tablets, or any other physical shape. The physical shape of the composite particles should be chosen so as to enhance the desired shape and relative composition of the resultant voids within the proppant matrix. For example, a rod-like particle shape may be suitable in applications wherein channel-like voids in the proppant matrix are desired. One of ordinary skill in the art with the benefit of this disclosure will recognize the specific degradable material and the preferred size and shape for a given application.

Additional materials may be incorporated in the proppant matrix, if desired, including, but not limited to, acid-reactive materials. Such acid-reactive materials in the proppant matrix compositions may comprise any material that reacts with an acid so that the acid is at least partially neutralized. Suitable examples include, but are not limited to, materials such as calcium carbonate, magnesium oxide, and calcium hydroxide. The acid-reactive material may react with the degradation products of the degradable material. This may be beneficial when the degradation products comprise an undesirable acid. When included in a proppant matrix composition, the acid-reactive material should be included in an amount sufficient to control the pH of any fluid in the proppant matrix and/or neutralize any acid present. Considerations that may be taken into account when considering the type and amount of acid-soluble component to include are, among others, the solubility of the reaction products, corrosion of any metals, and the control of scale formation.

An inert filler may be included in the proppant matrix compositions. Suitable inert fillers are materials that, inter alia, enhance the compressive strength of a proppant matrix. Suitable fillers include, but are not limited to, calcium carbonate, talc, mica, glass, silica, silica flour, or other similar mineral fillers.

The proppant matrix composition can either be pre-blended and then transported to the drill site, or it can be prepared on the fly at the drill site and then introduced downhole within a relatively short period of time. The term drill site, as used herein, refers to the workplace at the site of a drill hole. Preferably, the proppant particulates and the composite particles should be mixed so as to form a mixture in a fracturing treatment fluid. Any conventional fracturing treatment fluid may be used in accordance with the present invention.

The concentration of the composite particles in the proppant matrix composition ranges from about 0.1% to about 30%, based on the weight of the proppant particulates in the mixture. In certain preferred embodiments of the proppant matrix compositions of the present invention, the composite particles make up about 1% to about 5% of the proppant matrix composition. Additionally, the relative amounts in the proppant matrix composition should not be such that when degraded, an undesirable percentage of voids results in the proppant matrix making the proppant matrix potentially ineffective in maintaining the integrity of the fracture. One of ordinary skill in the art with the benefit of this disclosure will recognize an optimum concentration of composite particles that provides desirable values in terms of enhanced conductivity or permeability without undermining the stability of the proppant matrix itself.

Thus, the present invention is well adapted to carry out the objects and attain the ends and advantages mentioned as well as those which are inherent therein. While numerous changes may be made by those skilled in the art, such changes are encompassed within the spirit and scope of this invention as defined by the appended claims.

What is claimed is:

1. A method comprising:
   providing a proppant matrix composition, the proppant matrix composition comprising at least a plurality of proppant particulates and at least a plurality of composite particles, the composite particles comprising a degradable material and a filler material;
   introducing the proppant matrix composition into a fracture in a subterranean formation so as to form a proppant matrix in the fracture; and
   allowing the degradable material of the composite particles to degrade so as to form at least one void in the proppant matrix.

2. The method of claim 1 wherein at least one of the proppant particulates comprises a component selected from the group consisting of: curable resins; tackifying agents; interlocking proppant particulates; epoxy resins; furan resins; phenolic resins; furfuryl aldehyde resins: furfuryl alcohol resins; non-aqueous tackifying agents; aqueous tackifying agents; silyl modified polyamides; natural sand; ground nut hulls; man-made proppant particulates; bauxite; ceramics; polymeric particulates; low density particulates; and combinations thereof.

3. The method of claim 1 wherein at least one of the composite particles has a physical shape of a platelet, shaving, fiber, flake, ribbon, rod, strip, spheroid, toroid, pellet, or tablet.

4. The method of claim 1 wherein at least one of the proppant particulates have sizes in the range of from about 4 to 100 U.S. mesh.

5. The method of claim 1 wherein the proppant matrix composition comprises a component selected from the group consisting of: acid reactive materials; inert fillers; and combinations thereof.

6. The method of claim 1 wherein the composite particles are present in an amount of from about 0.1% to about 30% based on the weight of the proppant particulates in the proppant matrix composition.

7. The method of claim 1 wherein at least one of the composite particles comprises a material selected from the group consisting of: degradable polymers; aliphatic polyester homopolymers; random aliphatic polyester copolymers; block aliphatic polyester copolymers; star aliphatic polyester copolymers; hyperbranched aliphatic polyester copolymers; and combinations thereof.

8. The method of claim 1 wherein at least one of the composite particles comprises a material selected from the group consisting of: polysaccharides; chitins; chitosans; proteins; aliphatic polyesters; poly(lactides); poly(glycolides); poly($\epsilon$-caprolactones); poly(hydroxy ester ethers); poly(hydroxybutyrates); polyanhydrides; polycarbonates; poly(orthoesters); poly(acetals); poly(acrylates); poly(alkylacrylates); poly(amino acids); poly(ethylene oxides); poly ether esters; polyester amides; polyamides; polyphosphazenes; copolymers thereof; and blends thereof.

9. The method of claim 1 wherein the filler of at least one of the composite particle comprises a material selected from the group consisting of: anhydrous salts; glass; talc; calcium carbonate; mica; magnesium oxide; mineral fillers; barite; silica; ethylenediaminetetraacetic acid; oxidizers; breakers; sodium persulfate; magnesium peroxide; derivatives thereof; and combinations thereof.

10. The method of claim 1 wherein at least one of the composite particles comprises a component selected from the group consisting of: anhydrous salts; glass; talc; calcium carbonate; mica, magnesium oxide, mineral fillers; barite; silica; ethylenediaminetetraacetic acid; oxidizers; breakers; sodium persulfate; magnesium peroxide; derivatives thereof; and combinations thereof.

11. The method of claim 1 wherein the proppant matrix composition is blended and then transported to a drill site.

12. The method of claim 1 wherein the proppant matrix composition is prepared and used on-the-fly at the drill site.

13. The method of claim 1 wherein the proppant matrix composition is a component of a fracturing treatment fluid.

14. A method comprising:
providing a proppant matrix composition, the proppant matrix composition comprising at least a plurality of proppant particulates and at least a plurality of composite particles, the composite particles comprising a degradable material and a filler material;
allowing the proppant matrix composition to form a proppant matrix;
allowing the degradable material of the composite particle to degrade so as to form a void in the proppant matrix; and
allowing a fluid to flow through the proppant matrix.

15. The method of claim 14 wherein at least one of the proppant particulates comprises a curable resin anchor a tackifying agent.

16. The method of claim 14 wherein the degradable material in at least one of the composite particles does not substantially degrade until after the proppant matrix has substantially formed.

17. The method of claim 14 wherein at least one of the composite particles comprises a material selected from the group consisting of: polysaccharides; chitins; chitosans; proteins; aliphatic polyesters; poly(lactides); poly(glycolides); poly($\epsilon$-caprolactones); poly(hydroxy ester ethers); poly(hydroxybutyrates); polyanhydrides; polycarbonates; poly(orthoesters); poly(acetals); poly(acrylates); poly(alkylacrylates); poly(amino acids); poly(ethylene oxides); poly ether esters; polyester amides; polyamides; polyphosphazenes; copolymers thereof; and blends thereof.

18. The method of claim 14 wherein the filler of at least one of the composite particle comprises a component selected from the group consisting of: anhydrous salts; glass; talc; calcium carbonate; mica, magnesium oxide, mineral fillers; barite; silica; ethylenediaminetetraacetic acid; oxidizers; breakers; sodium persulfate; magnesium peroxide; derivatives thereof; and combinations thereof.

19. A method comprising:
providing a treatment fluid that comprises a proppant matrix composition, the proppant matrix composition comprising at least a plurality of proppant particulates and at least a plurality of composite particles, the composite particles comprising a degradable material and a filler material;
contacting at least a portion of a subterranean formation with the treatment fluid under conditions effective to create or enhance at least one fracture in the subterranean formation; and
allowing the proppant matrix composition to form a proppant matrix having at least one void therein.

20. The method of claim 19 wherein at least one of the composite particles comprises a material selected from the group consisting of: polysaccharides; chitins; chitosans; proteins; aliphatic polyesters; poly(lactides); poly(glycolides); poly($\epsilon$-caprolactones); poly(hydroxy ester ethers); poly(hydroxybutyrates); polyanhydrides; polycarbonates; poly(orthoesters); poly(acetals); poly(acrylates); poly(alkylacrylates); poly(amino acids); poly(ethylene oxides); poly ether esters; polyester amides; polyamides; polyphosphazenes; copolymers thereof; and blends thereof.

* * * * *